US006385602B1

(12) United States Patent
Tso et al.

(10) Patent No.: US 6,385,602 B1
(45) Date of Patent: May 7, 2002

(54) PRESENTATION OF SEARCH RESULTS USING DYNAMIC CATEGORIZATION

(75) Inventors: Michael Tso, Cupertino; Jeff Clarke, Menlo Park; Eugene Rollins, Sunnyvale; Arkady Borkovsky, San Francisco, all of CA (US)

(73) Assignee: e-centives, Inc., Bethesda, MD (US)

( * ) Notice: Subject to any disclaimer, the term of this patent is extended or adjusted under 35 U.S.C. 154(b) by 0 days.

(21) Appl. No.: 09/186,044

(22) Filed: Nov. 3, 1998

(51) Int. Cl.[7] .............................................. G06F 17/30
(52) U.S. Cl. ........................................................ 707/3
(58) Field of Search ....................... 707/1–10, 100–104, 707/201–203, 205; 709/201–203, 217; 345/473, 428

(56) References Cited

U.S. PATENT DOCUMENTS

| 5,742,816 A | * | 4/1998 | Barr et al. ................... 707/104 |
| 5,875,446 A | * | 2/1999 | Brown et al. ................... 707/3 |
| 5,924,090 A | * | 7/1999 | Krellenstein ................... 707/5 |
| 5,940,821 A | * | 8/1999 | Wical ............................. 707/3 |
| 6,028,605 A | * | 2/2000 | Conrad et al. .............. 345/354 |

OTHER PUBLICATIONS

Can et al., "Concept and effectiveness of the cover–coefficient–based clustering methodology for text database", 1990, ACM Press, NY, USA, pp. 483–517.*

* cited by examiner

*Primary Examiner*—John Breene
*Assistant Examiner*—Mohammad Ali
(74) *Attorney, Agent, or Firm*—Hickman Palermo Truong & Becker LLP; Edward A. Becker

(57) ABSTRACT

An approach for presenting search results using dynamic categorization involves examining search results and dynamically establishing one or more categories of search results based upon attributes of the search results. A variety of grouping or clustering techniques may be used to dynamically establish the categories of search results. The categories of search results are then presented using category indicators.

48 Claims, 5 Drawing Sheets

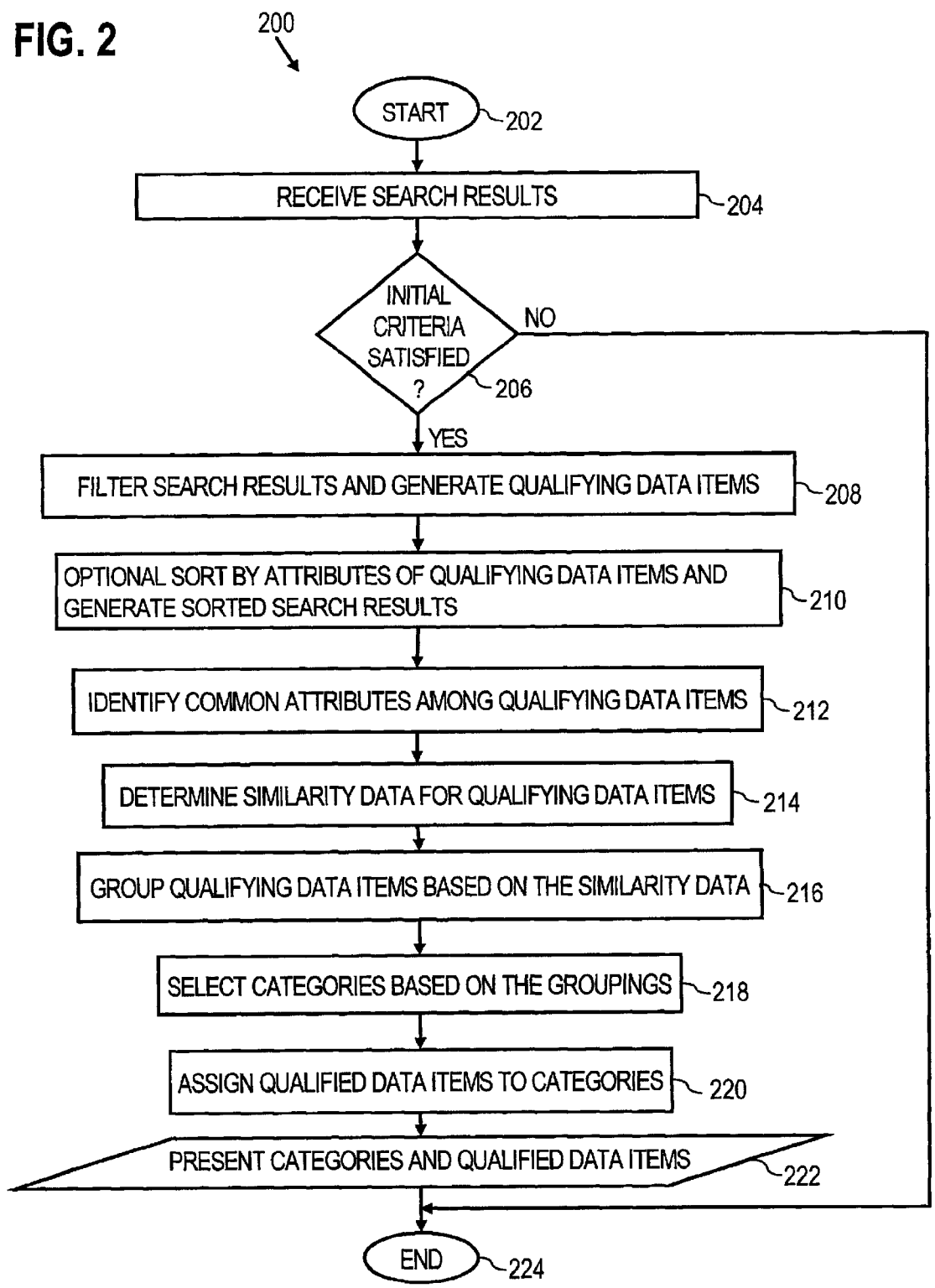

PRESENTATION OF SEARCH RESULTS USING DYNAMIC CATEGORIZATION

FIELD OF THE INVENTION

The present invention relates to information retrieval, and more specifically, to an approach for presenting search results using dynamic categorization.

BACKGROUND OF THE INVENTION

Information systems provide for the storage, retrieval and sometimes management of data. Information is typically retrieved from an information system by submitting a query to the information system, where the query specifies a set of retrieval criteria. The information system processes the query against a database and provides data that satisfies the search criteria (search results) to a user.

The form of search results depends upon the context in which a particular search is performed. For example, in the context of a database search, search results might consist of a set of rows from a table. In the context of the global information network known as the "Internet", the search results might consist of links to web pages.

For the purpose of explanation, the specific data items against which a search query is executed are referred to herein as searchable data items. The set of all searchable data items against which a query is executed is referred to herein as the searchable data set. The specific searchable data items that satisfy a particular query are referred to herein as matching data items. The set of all matching data items for a given query are referred to herein as the search results of the query.

Processing a query containing general or generic search terms against a large searchable data set can result in a large number of unorganized matching data items, sometimes referred to as "hits." For example, processing a query containing general or generic terms on the Internet can generate millions of hits.

On the Internet, search queries are processed by search tools known as "search engines" that typically present a sequential list of matching data items ranked by relevance, from most relevant to least relevant. As a result, the matching data items that best satisfy the search criteria are presented at the top of the list, with the other matching data items presented further down the list in order of decreasing relevance. For example, web pages or web sites with web pages that contain the greatest number of the search terms receive the highest relevance ranking and are presented at the top of the list.

Because the search results are presented serially, with approximately ten to twenty hits per page, reviewing a large number of hits, for example several thousand, or even only several hundred hits, is often impractical. This is not necessarily a problem in situations where the relevancy ranking drops off quickly after a relatively few number of hits because a user will typically only view the most relevant matching data items. However, in situations where a large number of hits have a high relevancy ranking, it can be impractical to review all of the most relevant hits.

One alternative approach for presenting search results is the static category approach. The static category approach involves pre-assigning all searchable data items to pre-defined or "static" subject matter categories based upon their content When a search is performed, a relatively fewer number of categories that satisfy the search criteria are displayed instead of or, in addition to, the actual matching data items. The members of those static categories (which may or may not satisfy the search criteria) can then be accessed through the categories.

In the context of the Internet, for example, all web pages and web sites containing subject matter relating to the topic of baseball would be statically assigned to a baseball category. When a query containing the term "baseball" is processed, the baseball category is displayed, instead of or in addition to, all of the individual web pages that satisfy the query terms. A user can then select the baseball category to view the web pages and web sites assigned to the baseball category. Categories containing a large number of searchable data items can be divided into sub-categories to create a statically-defined category hierarchy.

Although the static category approach is helpful in allowing a user to navigate through a large number of searchable data items in an organized manner, it suffers from several drawbacks. First, if the amount of information being searched is large, a large amount of resources can be required to pre-assign all of the searchable data items to categories. Furthermore, when the searchable data set changes, the category assignments must be updated to reflect the changes. For example, if new searchable data items are added to the searchable data set and the categories are not updated to reflect the new searchable data items, then a user cannot access the new searchable data items through the categories. As a result, the new searchable data items that cannot be accessed through the categories are effectively lost.

Another drawback to the static category approach is that the statically-defined categories may not be helpful in finding information that does not fit squarely into the predefined categories. Thus, a search may result in the display often categories, where each of the ten categories has a relatively low degree of relevance.

These problems are particularly acute on the Internet for at least two reasons. First, the Internet provides access to a vast amount of information which requires an enormous amount of resources to assign searchable data items to categories. Secondly, the information available through the Internet is constantly changing and new information is being added at an astounding rate. Consequently, a large amount of resources is required to maintain static categories that do not necessarily reflect all of the searchable data set Therefore, based upon the need to present a large number of matching data items in an organized manner and the limitations of prior approaches, an approach for presenting a large number of matching data items in an organized manner that does not suffer from the limitations of prior approaches is highly desirable.

SUMMARY OF THE INVENTION

According to one aspect of the invention, a method is provided for presenting search results using dynamic categorization. The method comprises the steps of receiving search results, dynamically establishing one or more search result categories based upon attributes of the search results and presenting one or more category identifiers corresponding to the one or more search result categories.

According to another aspect of the invention, a method is provided for presenting search results on a user interface using dynamic categorization. The method comprises the steps of dynamically establishing one or more search result categories based upon attributes of the search results and displaying on the user interface one or more interface objects corresponding to the one or more search result categories.

According to another aspect of the invention, a computer system is provided for presenting search results to a user using dynamic categorization. The computer system comprises a user interface, one or more processors and a memory coupled to the one or more processors. The memory contains one or more sequences of one or more instructions which, when executed by the one or more processors, cause the computer system to perform the steps of receiving search results, dynamically establishing one or more search result categories based upon attributes of the search results and displaying on the user interface one or more category indicators corresponding to the one or more search result categories.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 2 is a detailed flow chart illustrating an approach for presenting search results using dynamic categorization according to another embodiment of the invention;

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

In general, search results are presented using dynamic categorization. Dynamic categorization involves examining search results and dynamically establishing one or more search result categories based upon attributes of the search results. As described in more detail hereinafter, a varied of grouping or clustering techniques may be used to dynamically establish the search result categories. The search result categories are then presented using category indicators, as described in more detail hereinafter.

Dynamic categorization allows search result categories to be generated on a search-by-search basis while ensuring that all matching data items are assigned to at least one search result category. As a result, categories may be tailored to each set of search results and based on user or application preferences. Dynamic categorization may be used in combination with static categories to provide a hybrid category hierarchy. Finally, dynamic categorization may be used to modify search queries, as described in more detail hereinafter.

Figure 1:
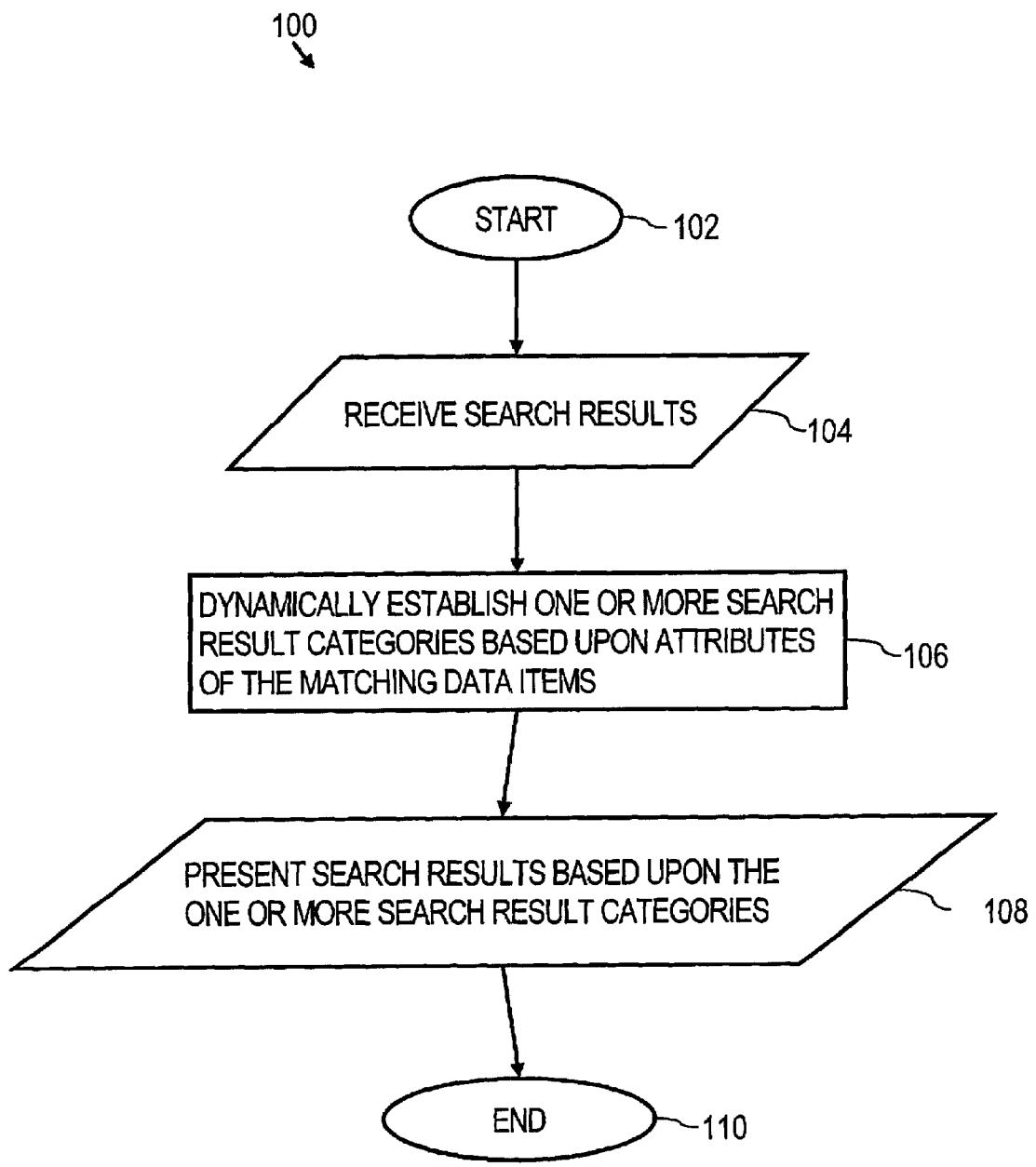
FIG. 1 is a high-level flow chart illustrating an approach for presenting search results using dynamic categorization according to an embodiment of the invention.

FIG. 1 is a flow chart 100 illustrating an approach for presenting search results using dynamic categorization according to an embodiment of the invention. After starting in step 102, in step 104 search results are received. In step 106, the search results are examined and one or more search result categories are dynamically established based upon attributes of the matching data items that satisfy the query. In step 108, the search results are presented to a user based upon the one or more search result categories, as described in more detail hereinafter. Finally, the process is complete in step 110.

1. DYNAMICALLY DETERMINING CATEGORIES

Dynamically determining categories involves identifying similarities and/or dissimilarities of attributes in the matching data items and establishing a set of candidate categories based upon the identified similarities and/or dissimilarities. The nature of the attributes used to determine similarities and/or dissimilarities may differ based on the nature of the matching data items. For example, if the matching data items are structured records, the attributes used to determine the categories may be selected fields of the structured records. On the other hand, if the matching data items are relatively unstructured text-based electronic documents, then the attribute values used to determine categories may simply be similarity coefficients that have been generated based on comparisons between the text contents of the documents.

The candidate categories may be filtered or otherwise processed to select an appropriate number of final categories from the candidate categories. In situations where the number of candidate categories is sufficiently small, the filtering may not be necessary. Ideally, the number of final categories is selected so that when the final categories are presented to a user, the user can review the final categories in a relatively short period of time. Accordingly, the actual number of final categories necessarily depends upon both the requirements of a particular application and the way in which the final categories are presented to the user.

Once the final categories are determined, the matching data items are assigned to the final categories and the final categories are presented to the user. The steps of determining candidate categories, determining final categories based upon the candidate categories and assigning the matching data items to the final categories are collectively referred to as "clustering." The particular clustering technique used depends upon the particular requirements of an application and the invention is not limited to any particular clustering technique. Examples of clustering techniques include Bayesian clustering, neural networks, Jaccard similarity coefficients, semantic analysis and various natural language processing algorithms. The particular clustering algorithm used may be user-defined.

The approach of presenting search results using dynamic categorization is now described with reference to the flow chart 200 of FIG. 2. After starting in step 202, in step 204 search results are received. The particular way in which a search is performed is not germane to embodiments of the invention and embodiments of the invention are not limited to any particular type of search.

In step 206, a determination is made as to whether initial criteria are satisfied. According to one embodiment of the invention, the initial criteria include a minimum number of search results. If the number of matching data items are below a minimum threshold, then dynamic categorization is not used and traditional presentation approaches are used instead. Another example of the initial criteria is whether the search results consist of data from more than one data source (e.g. different databases, such as a real time query and a static database query), where dynamic categorization is used to combine the data from the different sources to be presented to the user. If the initial criteria are not satisfied, then the process is complete in step 224.

If, however, in step 206, a determination is made that the initial criteria are satisfied, then in step 208 the matching data items (search results) are filtered to generate filtered search results. According to one embodiment of the invention, the matching data items are filtered by a relevance threshold. Traditional search techniques provide a relevancy rating for search results that indicates how well individual matching data items satisfy the search criteria In situations where a query results in a large number of matching data items, it is often useful to reduce the amount of matching data items by discarding matching data items that do not satisfy a minimum relevance threshold.

For example, for particular search results containing a large amount of data, all matching data items having a relevancy of less than fifty percent might be discarded. According to another embodiment of the invention, a particular number of the most relevant hits are retained, with the remaining hits being discarded. For example, suppose a determination is made that at most one hundred hits are desired. A particular search is performed and the search results include twenty thousand hits. In this situation the relevancy ratings for the matching data items are used to identify and keep the one hundred most relevant hits and discard the remaining nineteen thousand, nine hundred hits.

For the purpose of explanation, the matching data items that are not discarded during the filtering process are referred to herein as qualifying data items. Thus, in the example given above, the query resulted in twenty thousand matching data items, but only one hundred qualifying data items.

In step 210, the qualifying data items are optionally sorted by one or more attributes to generate sorted search results. For example, in the context of search results that include addresses, the search results might be sorted by zip code.

In step 212, common attribute values among the qualifying data items are identified. The common attribute values are specific to each set of search results. For example, for search results pertaining to automobiles, common attribute values may include compact cars, mid-size cars, fill size cars, and sports cars.

In step 214, similarity data is determined for the search results that indicates the occurrence of the common attribute values among the qualifying data items. For example, the similarity data would indicate how many of the hits in the filtered search results have the attribute values of compact cars, mid-size cars, full size cars, and sports cars, respectively. In step 216, the search results are grouped based upon the similarity data. For example, the qualifying data items having the compact car attribute value are grouped together and the hits in the search results having the mid-size car attribute value are grouped together.

In step 218, one or more categories are selected based upon the groupings. According to one embodiment of the invention, the one or more categories are selected by a majority vote. Specifically, the categories having the most qualifying data items are selected. Categories having relatively few numbers of qualifying data items are collapsed into broader categories, so as to reduce the total number of selected categories.

In step 220, the qualifying data items are assigned to the categories. For example, the hits having the compact car attribute are assigned to the compact car category. For hits having attributes of categories that were collapsed into broader categories, those hits are assigned to the broader category. For example, if the mid-size car and fill size car categories are collapsed into a single full size car category, then all of the hits having the mid-size car attribute are included in the full size car category. In step 222, the categories and qualifying data items are presented to the user, as described in more detail hereinafter. The process is complete in step 224.

In steps 214 and 216, more than one algorithm may be used to produce a number of groupings according to one embodiment of the invention, an optimal grouping may be selected as the grouping presented to the user. An optimal grouping is typically determined based upon the requirements of a particular application. For example, grouping by one attribute may produce more categories than grouping by another attribute. Conversely, some groupings may cluster results with similar relevance scores (which may be independent of the categorization criteria). This may be more preferable in some circumstances than groupings with smaller number of categories.

An application can also have access to the different groupings formed during steps 214 and 216, so that the application or the user may elect to view a different grouping other than the one initially selected for presentation. This ability to take different views of what is basically the sane large collection of data is akin to doctors using X-ray, MRI, and CatScan to look at the same tumor in different ways in order to understand it better.

2. PRESENTING SEARCH RESULTS

Figure 3A:
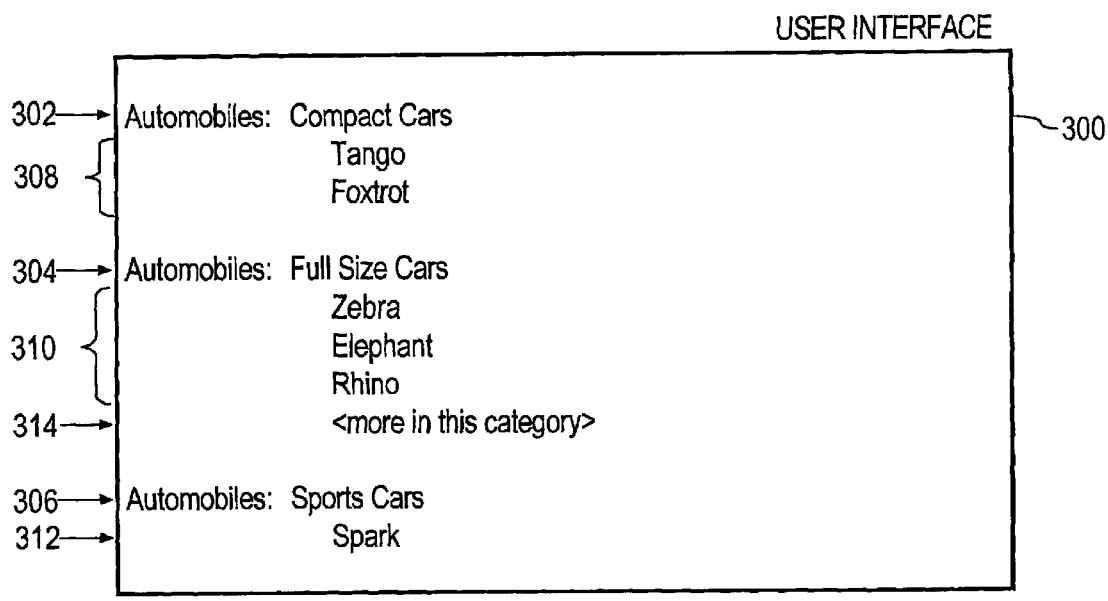
FIG. 3A is a block diagram illustrating a user interface for presenting search results using dynamic categorization according to an embodiment of the invention.

FIG. 3A illustrates a user interface 300 for presenting search results using dynamic categorization according to an embodiment of the invention. User interface 300 may be implemented in any combination of discrete hardware circuitry and computer software. Typically, user interface 300 is provided as a graphical representation on a computer screen that is generated by the execution of sequences of instructions by one or more processors.

Categories that are dynamically determined in accordance with embodiments of cw the invention are presented using category indicators. A category indicator is any object that is capable of representing a category. Since the invention is not limited to any particular medium for presenting search results, the type of category indicator may vary depending upon the requirements of a particular application. For example, for presenting search results on a user interface, a user interface object may be used as a category indicator. The user interface object may provide some indicia that it corresponds to a particular category of search results, dynamically determined in accordance with embodiments of the invention. For presenting search results in a data file or on a printer, a category indicator may include a text string identifying the corresponding category.

Referring to the prior example of search results pertaining to automobiles, user interface 300 includes three category indicators 302, 304 and 306 that correspond to the dynamically-determined categories previously described. Category indicator 302 corresponds to the category "automobiles: compact cars" and includes two qualifying data items from the search results, designated by the reference numeral 308. Qualifying data items 308 include compact cars "Tango" and "Foxtrot". Category indicator 304 corresponds to the category "Automobiles: Full Size Cars" that includes qualifying data items 310. Qualifying data items 310 include full size cars, "Zebra," "Elephant" and "Rhino." Category indicator 306 corresponds to the category "Automobiles: Sports Cars" that includes a qualifying data item 312. Qualifying data item 312 is a sports car "Spark."

For purposes of illustration, in FIG. 3A the qualifying data items 308, 310, 312 and 314 are displayed with their respective category indicators 302, 304 or 306. However, according to another embodiment of the invention, qualifying data items 308, 310, 312 and 314 are not initially displayed. Rather, only category indicators 302, 304 and 306 are initially displayed to reduce the amount of information on user interface 300. The respective qualifying data items 308, 310, 312 and 314 are displayed in response to a user selection of category indicators 302, 304 and 306. For example, in response to a user selection of category indicator 302, qualifying data items 308 are displayed. In response to another user selection (de-selection) of category indicator 302, qualifying data items 308 are undisplayed from user interface 300. This is particularly helpful when category indicator 302 contains a sufficiently large number of qualifying data items 308 such that other category indicators 304 and 306 cannot be displayed simultaneously with the members of the category associated with category indicator 302.

User interface 300 also includes an indicator 314 identified as "<more in this category>." In response to the selection of indicator 314 by a user, additional hits in the category corresponding to category indicator 304 are displayed on user interface 300. Indicator 314 provides the benefit of informing a user that additional hits for the category corresponding to category indicator 304 are available, without over-cluttering user interface 300.

For example, if qualifying data items 308, 310 and 312 are structured records, the text titles may be derived from fields in the structured records. In the present example, both of the qualifying data items 308, namely "Tango" and "Foxtrot" may have a "compact car" field. In circumstances where qualifying data items 308, 310 and 312 are relatively unstructured text-based electronic documents, then category indicators 302, 304 and 306 may not be displayed at all. Instead, the first qualifying data item in qualifying data items 308, 310 and 312, namely "Tango," "Zebra," and "Spark" would be displayed on user interface 300 followed by a user-selectable "<more like this>" indicator. This approach displays a representative qualifying data item in qualifying data item 308, 310 and 312 while allowing a user to easily view the remaining qualifying data items by selecting the "<more like this>" indicator. The text titles provided with category indicators 302, 304 or 306 are derived from attributes of their respective qualifying data items 308, 310 and 312.

Categories within a group may be presented to users in any order. However, some orderings may be preferable to others. For example, a group by unit price range may be more suitably displayed initially sorted by price range. A common way of presenting groups during "fuzzy" searches (where matches aren't exact) is by relevance. A category relevance rating can be calculated for each category, and the categories can then be presented in relevance sorted order.

Category relevance can be calculated in any number of ways depending on the requirements of a particular application. One way is to assign the highest relevance score of any item in the category as the category's score. This has the effect of elevating groups containing at least one high scoring item to the top. Another way is to assign the average score of all items in the category as the category's score. Yet another way is to use the median, or a weighted average. In the case where there isn't a clear ordering even after assigning the scores to the categories, (e.g. scores are very similar), another ordering (such as alphabetical) may be used as a tie breaker. Again, the user and the application may have complete control on which algorithm is used, and can select different algorithms.

3. SUB-CATEGORIES

Dynamic categorization may also be used to generate sub-categories. Generating sub-categories is particularly useful when a category has a large number of hits. For example, referring to FIG. 3B, in the situation where the category corresponding to category indicator 304 contains a large number of hits, sub-categories are generated and subcategory indicators 316 and 318 corresponding to the sub-categories are presented on user interface 300. The sub-categories corresponding to sub-category indicators 316 and 318 are generated based upon attributes of qualifying data items 310 contained in the category corresponding to category indicator 304.

In the present example, qualifying data items 310 have a price attribute which is used to generate the sub-categories that correspond to sub-category indicators 316 and 318. Specifically, the sub-category corresponding to sub-category indicator 316 is generated for bits having a price attribute of less than $25,000. In the present example, this sub-category includes entries 320 "Zebra" and "Elephant." On the other hand, the sub-category corresponding to sub-category indicator 318 is generated for hits having a price attribute of more than $25,000. This sub-category includes a hit 322 "Rhino." The sub-category corresponding to sub-category indicator 318 also includes a hit 324 designated as "<more in this category>" that provides access to additional hits in sub-category 318.

According to one embodiment of the invention, sub-category indicators 316 and 318 and hits 318, 320 and 322 are not initially displayed under category indicator 304. In response to a user selection of category indicator 304, sub-category indicators 316 and 318 are displayed, but not hits 318, 320 and 322. Then, in response to a user selection of subcategory indicators 316 and 318, hits 318, 320 and 322 are displayed, respectively. This is particularly helpful when the category corresponding to category indicator 304 contains a large number of hits. Sub-category indicators 316 and 318 may also be de-selected and undisplayed as previously described with respect to category indicators 302, 304 and 306.

4. USER-SELECTABLE CATEGORIES

According to another embodiment of the invention, a set of one or more candidate categories are presented to a user and the user is permitted to select one or more of the candidate categories, and/or one or more sets of candidate categories, to be used as the final categories to present the search results. Once the user selects the final categories, the qualified data items are assigned to the final categories and the final categories and search results are presented to the user.

Figure 3B:
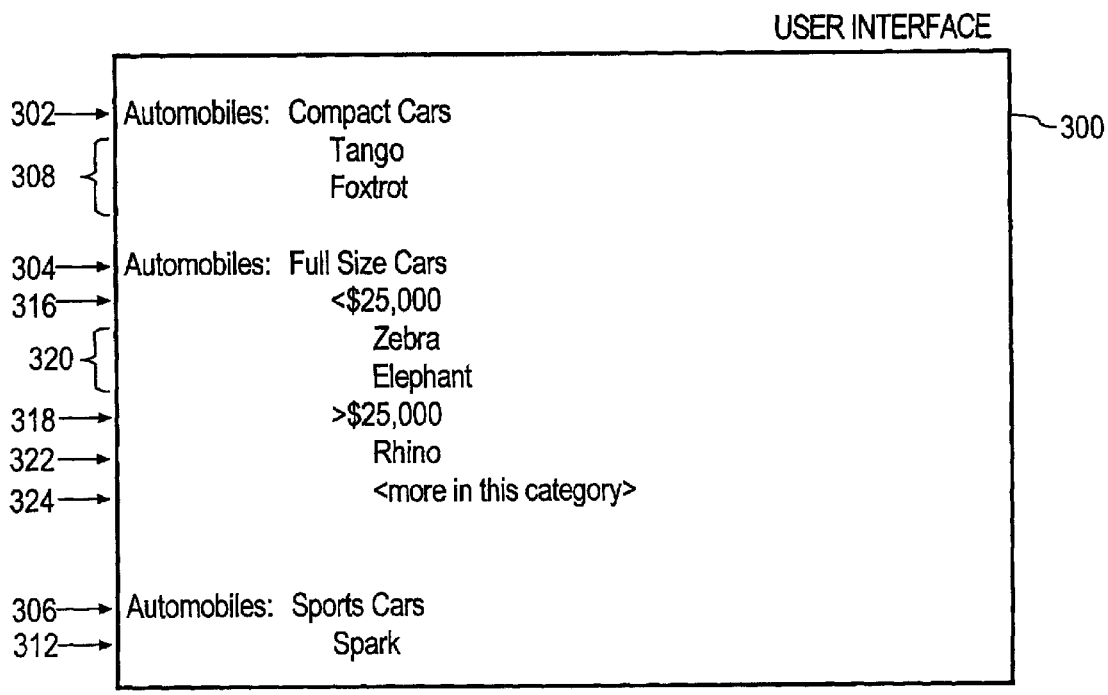
FIG. 3B is a block diagram illustrating a user interface for presenting search results using dynamic categorization and sub-categories according to an embodiment of the invention.
Figure 3C:
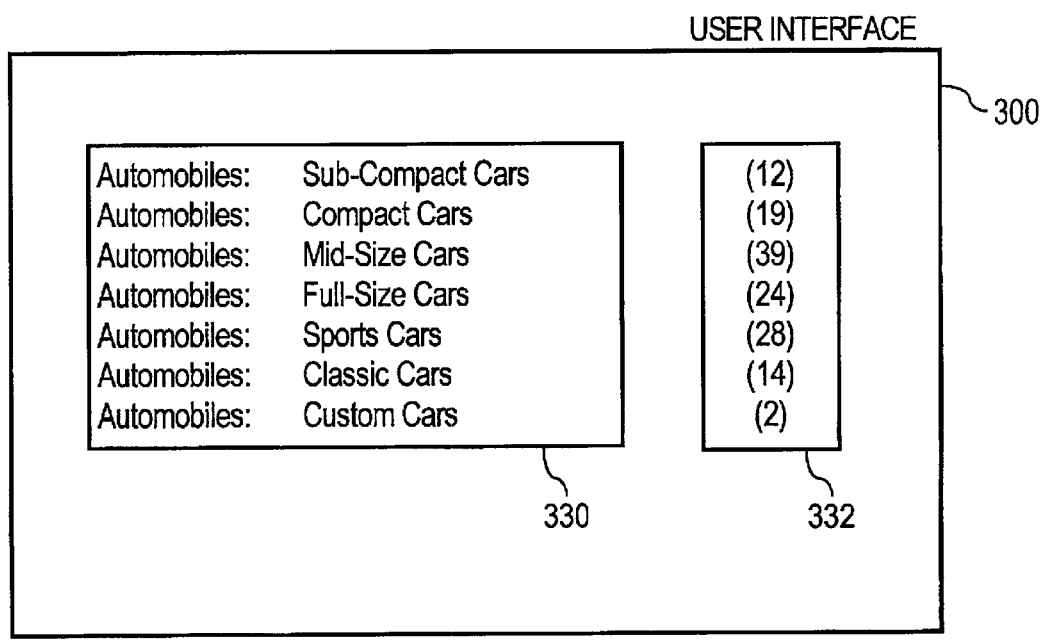
FIG. 3C is a block diagram illustrating a user interface for presenting search results using dynamic categorization and user-selectable categories according to an embodiment of the invention.

As illustrated in FIG. 3C, user interface 300 includes a set of user-selectable category indicators 330 corresponding to categories that have been determined using the dynamic categorization approach described herein A user may select one or more of the user-selectable category indicator 330 to be used in presenting the search results to the user. This provides a user with the flexibility to choose specific categories to be used to categorize the search results. User interface 300 also includes a set of hit counts 332 that indicate how many hits are assigned to each of the user-selectable categories 330. The hit counts 332 provide information that may help the user determine which of the user-selectable categories he or she might want to chose.

According to one embodiment, the user may select one or more sets of categories, where the categories within one set are established based on different attributes than the categories within the other sets. For example, one set of categories may group cars according to their size, while another set of categories groups cars according to their price range, while yet another set of categories groups cars according to their manufacturer. The user may then select specific categories from one or more of the category sets on a category by category basis, or on an entire category-set by category-set basis.

Significantly, when some final categories are generated based on different attributes than other final categories, then it is possible for the same qualifying data item to be assigned to more final one of the final categories. For example, if a user selects a particular car size category as a final category, a particular price range category as a final category, and a particular manufacturer category as a final category, it is possible for a qualifying data item that contains information about a particular car to fall into all three of the selected categories.

5. USING DYNAMIC CATEGORIZATION WITH STATIC CATEGORIES

Dynamic categorization may also be used with static categories. Using dynamic categorization with static categories is particularly helpful when a static category includes a large number of hits. Under these circumstances, dynamic categorization may be used to determine one or more sub-categories to organize the hits contained in the particular category. Dynamic categorization is also particularly helpful when certain hits are not assigned to any static categories. These hits are often referred to as "orphan hits." Additional categories may be generated for the orphan hits using the dynamic categorization approach described herein.

For example, referring to FIG. 3B, suppose that category indicator 304 is a static category that contains a large number of hits. Under these circumstances, dynamic categorization is useful to dynamically determine sub-categories, as previously described, to provide additional organization to the hits contained in the static category corresponding to static category indicator 304. If the sub-categories contain too many hits, then additional sub-categories may be generated. The additional sub-categories may be added to static category associated with category indicator 304 or to the sub-categories associated with sub-category indicators 316 and 318.

6. MODIFYING SEARCH CRITERIA USING DYNAMIC CATEGORIZATION

Dynamic categorization may also be used to modify search criteria to be used in subsequent searches. A search query may be modified (broadened or narrowed) based upon dynamic categories determined by dynamic categorization. Specifically, query terms that correspond to dynamic categories may be added to a search query, replace existing query terms or be used instead of existing query terms. For example, suppose in the prior example the original query was "automobile". The original query may be modified to add the term "sports cars" to form a new query "automobile AND sports cars" when the user selects the category identifier for the dynamically determined "sports car" category. As another example, the original query may be modified to just "sports cars". Care must be taken not to overly narrow a search query by adding in too many terms associated with dynamic categories. For example, the search query "automobiles AND compact cars AND full size cars AND sports cars" may not yield any search results. Each category may optionally have keywords associated with it which can be used in narrowing the search (used as AND or OR terms). The keywords can be statically defined in a dictionary, or may be dynamically generated by looking for the most common words in items in each category. It may be advantageous to use AND terms more sparingly than OR terms since they may overly limit the search.

The invention is not limited in its application to any particular type of search results. Rather, dynamic categorizations may be used with any type of search results. Further, although dynamic categorization has been described herein primarily in the context of categorizing search results from a new search, dynamic categorization may also be used with portions of search results. For example, dynamic categorization may be applied to a locally cached portion of search results and optionally extended to the remaining portions of the search results, i.e. the portions of the search results that are remotely stored. In addition, the approach described herein may be applied to locally cached search results that are periodically updated by background search processes. Thus, the approach described herein may be applied to any portion of search results.

Embodiments of the invention are also applicable to real-time search applications where after a query is processed, matching data items are received and categories have already been dynamically determined as described herein, additional matching data items are received. In this circumstance, the additional matching data items are examined and added to the existing categories if possible. For example, additional matching data items that have attributes that are sufficiently similar to attributes of the existing categories can be added to those categories. The additional matching data items that cannot be assigned to existing categories may be retained as part of the search results and included in the next dynamic categorization. As a result, when a user elects to re-categorize, then all of the additional matching data items may be assigned to categories.

7. IMPLEMENTATION MECHANISMS

The approach for presenting search results using dynamic categorization as described herein may be implemented in discrete hardware circuitry, in computer software, or a combination of discrete hardware circuitry and computer software.

Figure 4:
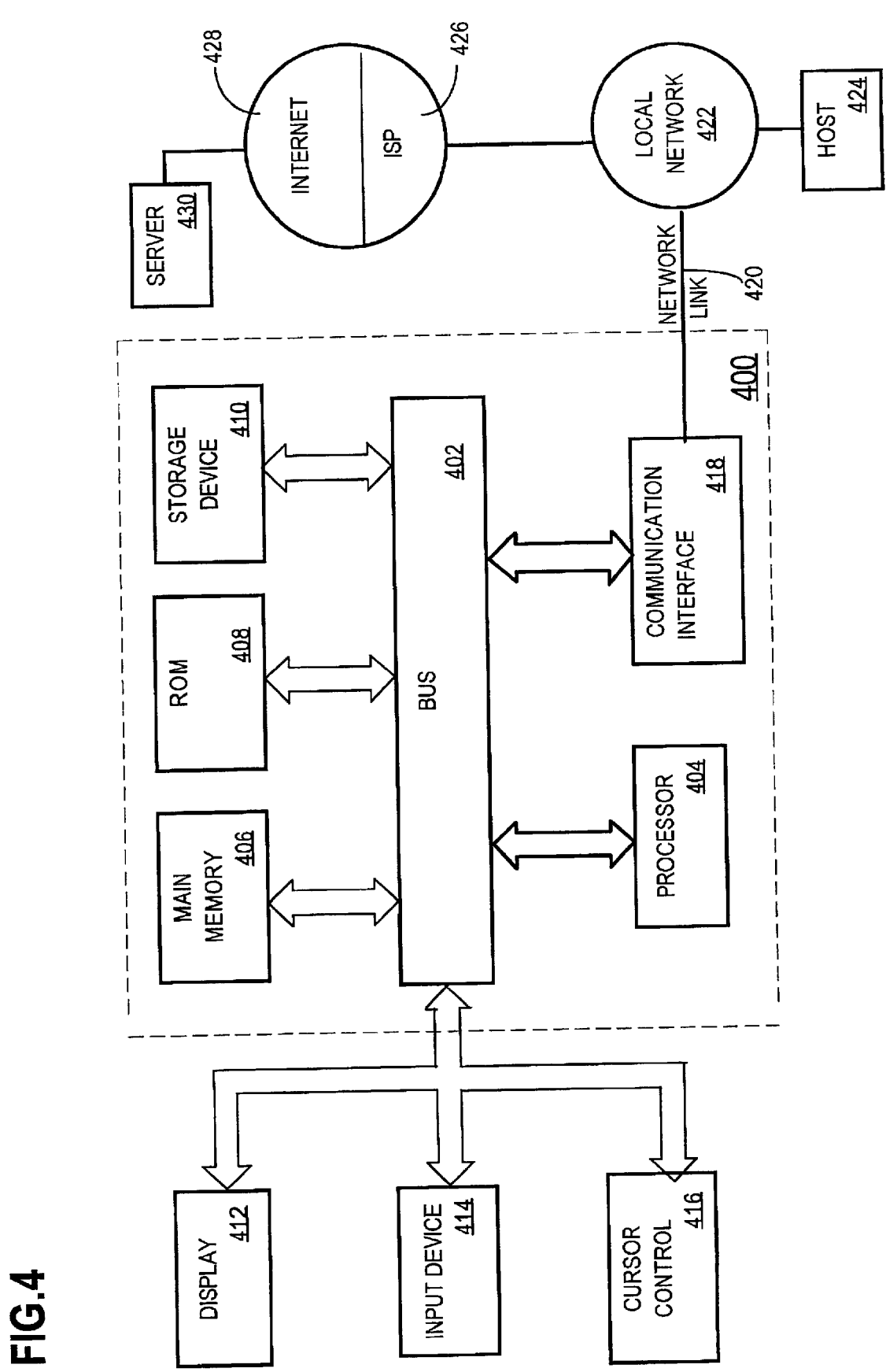
FIG. 4 is a block diagram of a computer system on which embodiments of the invention may be implemented.

FIG. 4 is a block diagram that illustrates a computer system 400 upon which embodiments of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for presenting search results using dynamic categorization. According to one embodiment of the invention, the presentation of search results using dynamic categorization is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, SP 426, local network 422 and communication interface 418. In accordance with the invention, one such downloaded application provides for presenting search results using dynamic categorization as described herein.

The received code may be executed by processor 404 as it is received, and/or stored in storage device 410, or other non-volatile storage for later execution. In this manner, computer system 400 may obtain application code in the form of a carrier wave.

The approach for presenting search results using dynamic categorization as described herein provides several advantages over prior approaches for presenting search results. First, a large number of search results can be presented to a user in an organized manner without the loss of information. This eliminates the need to reduce the amount of search results by narrowing search criteria In addition, since dynamically-determined categories are based upon the attributes of particular search results, the dynamically determined categories are customized to each set of search results. In particular, this allows unique sets of subcategories to be generated for each set of search results. Furthermore, the approach for presenting search results using dynamic categorization as described herein may be implemented using any type of clustering technique. Finally, dynamically-determined categories can be used to modify search criteria to aid in subsequent searches.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for presenting search results, the method comprising the steps of:
   receiving search results;

dynamically establishing one or more search result categories based upon attributes of the search results by identifying common attributes among the search results,
  generating a set of one or more coefficients that reflect the similarity or dissimilarity of the search results based upon the common attributes,
  grouping the search results based upon the set of one or more coefficients, and
  selecting the one or more categories based upon the grouping of the search results; and
presenting one or more category identifiers corresponding to the one or more search result categories.

2. The method as recited in claim 1, wherein every member of the one or more search result categories is a data item that satisfies criteria specified in a query that produced the search results.

3. The method as recited in claim 1, wherein the step of identifying common attributes among the search results is performed using Bayesian clustering techniques.

4. The method as recited in claim 1, wherein the step of identifying common attributes among the search results is performed using a neural network.

5. The method as recited in claim 1, wherein
  the coefficients are Jaccard coefficients, and
  the step of generating a set of one or more coefficients that reflect the similarity of the search results based upon the common attributes includes the step of generating a set of one or more Jaccard coefficients that reflect the similarity of the search results based upon the common attributes.

6. The method as recited in claim 1, wherein
  the search results are first search results,
  the method further comprises the step of applying relevance criteria to the first search results to generate second search results that satisfy the relevance criteria, and
  the step of dynamically establishing one or more search result categories based upon attributes of the search results includes the step of dynamically establishing one or more search result categories based upon attributes of the second search results.

7. The method as recited in claim 1, wherein
  the method further comprises the step of sorting the search results by the attributes of the search results to generate sorted search results, and
  the step of dynamically establishing one or more search result categories based upon attributes of the search results includes the step of dynamically establishing one or more search result categories based upon attributes of the sorted search results.

8. The method as recited in claim 1, wherein the search results include a plurality of matching data items and the method further comprises the step of assigning the matching data items to the one or more search result categories.

9. The method as recited in claim 1, further comprising the step of in response to a user selection, presenting search results associated with the one or more search result categories.

10. The method as recited in claim 1, wherein the method farther comprises the steps of
  dynamically establishing one or more search result sub-categories based upon both the one of said search result categories and the search results that belong to said one of said search result categories, and
  presenting one or more sub-category identifiers corresponding to the one or more search result sub-categories.

11. The method as recited in claim 10, further comprising the step of in response to a user selection, presenting search results associated with the one or more sub-categories.

12. A method for presenting search results comprising the steps of:
  receiving search results;
  dynamically establishing one or more search result categories based upon attributes of the search results;
  presenting one or more category identifiers corresponding to the one or more search result categories; and
  presenting one or more static category identifiers corresponding to one or more static search result categories.

13. The method as recited in claim 12, farther comprising the steps of,
  presenting first search results corresponding to the one or more search result categories, and
  presenting second search results corresponding to the one or more static search result categories.

14. A method for presenting search results comprising the steps of:
  in response to a user selection of one or more of the one or more candidate category identifiers, establishing one or more final search result categories based upon both the one or more candidate search result categories and the user selection; and
  presenting one or more final category identifiers corresponding to the one or more final search result categories.

15. A method for presenting search results on a user interface, the method comprising the steps of:
  displaying on the user interface one or more user interface objects corresponding to the one or more search result categories that have been dynamically established based upon attributes of the search results; and
  displaying on the user interface one or more user interface objects corresponding to one or more static categories.

16. The method as recited in claim 15, further comprising the step of responding to a user selection of a particular user interface object from the one or more user interface objects by displaying on the user interface search results associated with a particular search result category corresponding to the particular user interface object.

17. The method as recited in claim 15, further comprising the step of in response to a first user selection of a first user interface object from the one or more user interface objects, displaying on the user interface one or more sub-category user interface objects corresponding to one or more sub-categories, wherein the one-or-more sub-categories are associated with the category corresponding to the first user interface object, the one or more sub-categories being dynamically determined based upon the attributes of the search results.

18. The method as recited in claim 17, further comprising the step of in response to a second user selection of the first user interface object, undisplaying from the user interface the one or more sub-category user interface objects.

19. The method as recited in claim 17, further comprising the step of in response to a second user selection of the one or more sub-category user interface objects, displaying on the user interface search results associated with the one or more sub-categories corresponding to the sub-category user interface objects.

20. The method as recited in claim 19, further comprising the step of in response to a fourth user selection of the one or more sub-category user interface objects, undisplaying from the user interface the search results associated with the one or more sub-categories corresponding to the sub-category user interface objects.

21. A computer system for presenting search results to a user, the computer system comprising:
- a user interface;
- one or more processors; and
- a memory commutatively coupled to the one or more processors and containing one or more sequences of one or mote instructions which, when executed by the one or more processors, cause the computer system to perform the steps of
  - receiving search results,
  - dynamically establishing one or more search result categories based upon attributes of the search results by
    - identifying common attributes among the search results,
    - generating a set of one or more coefficients that reflect the similarity or dissimilarity of the search results based upon the common attributes,
    - grouping the search results based upon the set of one or more coefficients, and
    - selecting the one or more categories based upon the grouping of the search results; and
  - displaying on the user interface the one or more category indicators corresponding to the one or more search result categories.

22. The computer system as recited in claim 21, wherein every member of the one or more search result categories is a data item that satisfies criteria specified in a query that produced the search results.

23. The computer system as recited in claim 21, wherein the step of identifying common attributes among the search results is performed using Bayesian clustering techniques.

24. The computer system as recited in claim 21, wherein the step of identifying common attributes among the search results is performed using a neural network.

25. The computer system as recited in claim 21, wherein the coefficients are Jaccard coefficients, and
the step of generating a set of one or more coefficients that reflect the similarity of the search results based upon the common attributes includes the step of
generating a set of one or more Jaccard coefficients that reflect the similarity of the search results based upon the common attributes.

26. The computer system as recited in claim 21, wherein the search results are first search results,
the memory system further comprises instructions for performing the step of applying relevance criteria to the first search results to generate second search results that satisfy the relevance criteria, and
the step of dynamically establishing one or more search result categories based upon attributes of the search results includes the step of dynamically establishing one or more search result categories based upon attributes of the second search results.

27. The computer system as recited in claim 21, wherein the memory fixer includes instructions for performing the step of sorting the search results by the attributes of the search results to generate sorted search results, and
the step of dynamically establishing one or more search result categories based upon attributes of the search results includes the step of dynamically establishing one or more search result categories based upon attributes of the sorted search results.

28. The computer system as recited in claim 21, wherein the search results include a plurality of matching data items and the method farther comprises the step of assigning the matching data items to the one or more search result categories.

29. The computer system as recited in claim 21, wherein the memory further includes instructions for performing the step of in response to a user selection, presenting search results associated with the one or more search result categories.

30. The computer system as recited in claim 21, wherein the memory further includes instructions for performing the steps of
dynamically establishing one or more search result sub-categories based upon both the one of said search result categories and the search results that belong to said one of said search result categories, and
presenting one or more sub-category identifiers corresponding to the one or more search result sub-categories.

31. The computer system as recited in claim 30, wherein the memory further includes instructions for performing the step of in response to a user selection, presenting search results associated with the one or more sub-categories.

32. A computer system for presenting search results comprising:
- one or more processors; and
- a memory communicatively coupled to the one or more processors and containing one or more sequences of one or more instructions which, when executed by the one or more processors, cause the one or more processors to perform the steps of:
  - receiving search results;
  - dynamically establishing one or more search result categories based upon attributes of the search results;
  - presenting one or more category identifiers corresponding to the one or more search result categories; and
  - presenting one or more static category identifiers corresponding to one or more static search result categories.

33. The computer system as recited in claim 32, wherein the memory further includes one or more additional instructions which, when processed by the one or more processors, cause the one or more processors to perform the steps of
presenting first search results corresponding to the one or more search result categories, and
presenting second search results corresponding to the one or more static search result categories.

34. A computer system for presenting search results comprising:
- one or more processors; and
- a memory communicatively coupled to the one or more processors and containing one or more sequences of one or more instructions which, when executed by the one or more processor cause the one or more processors to perform the steps of:
  - receiving search results;
  - dynamically establishing one or more candidate search result categories based upon attributes of the search results;
  - presenting one or more candidate category identifiers corresponding to the one or more candidate search result categories;
  - in response to a user selection of one or more of the one or more candidate category identifiers, establishing one or more final search result categories based upon both the one or more candidate search result categories and the user selection; and presenting one or more final category identifiers corresponding to the one or more final search result categories.

35. A computer-readable medium carrying one or more sequences of one or more instructions for presenting search results to a user, the one or more sequences of one or more instructions including instructions which, when executed by one or more processors, cause the one or more processors to perform the steps of:

receiving search results, dynamically establishing one or more search result categories based upon attributes of the search results by identifying common attributes among the search results, generating a set of one or more coefficients that reflect the similarity or dissimilarity of the search results based upon the common attributes, grouping the search results based upon the set of one or more coefficients, and selecting the one or more categories based upon the grouping of the search results; and displaying on the user interface one or more category indicators corresponding to the one or more search result categories.

36. The computer-readable medium as recited in claim 35, wherein every member of the one or more search result categories is a data item that satisfies criteria specified in a query that produced the search results.

37. The computer-readable medium as recited in claim 35, wherein the step of identifying common attributes among the search results is performed using Bayesian clustering techniques.

38. The computer-readable medium as recited in claim 35, wherein the step of identifying common attributes among the search results is performed using a neural network.

39. The computer-readable medium as recited in claim 35, wherein the coefficients are Jaccard coefficients, and the step of generating a set of one or more coefficients that reflect the similarity of the search results based upon the common attributes includes the step of generating a set of one or more Jaccard coefficients that reflect the similarity of the search results based upon the common attributes.

40. The computer-readable medium as recited in claim 35, wherein the search results are first search results, the computer-readable medium further includes instructions for performing the step of applying relevance criteria to the first search results to generate second search results that satisfy the relevance criteria, and the step of dynamically establishing one or more search result categories based upon attributes of the search results includes the step of dynamically establishing one or more search result categories based upon attributes of the second search results.

41. The computer-readable medium as recited in claim 35, wherein the computer-readable medium further includes instructions for performing the step of sorting the search results by the attributes of the search results to generate sorted search results, and the step of dynamically establishing one or more search result categories based upon attributes of the search results includes the step of dynamically establishing one or more search result categories based upon attributes of the sorted search results.

42. The computer-readable medium as recited in claim 35, wherein the search results include a plurality of matching data items and the method further comprises the step of assigning the matching data items to the one or more search result categories.

43. The computer-readable medium as recited in claim 35, wherein the computer-readable medium further includes instructions for performing the step of in response to a user selection, presenting search results associated with the one or more search result categories.

44. The computer-readable medium as recited in claim 35, further including instructions for performing the steps of dynamically establishing one or more search result sub-categories based upon both the one of said search result categories and the search results that belong to said one of said search result categories, and presenting one or more sub-category identifiers corresponding to the one or more search result sub-categories.

45. The computer-readable medium as recited in claim 44, further including instructions for performing the step of in response to a user selection, presenting search results associated with the one or more sub-categories.

46. A computer-readable medium for presenting search results, the computer readable medium carrying one or more sequences of one or more instructions which, when processed by one or more processors, cause the one or more processors to perform the steps of:

receiving search results;

dynamically establishing one or more search result categories based upon attributes of the search results, presenting one or more category identifiers corresponding to the one or more search result categories; and presenting one or more static category identifiers corresponding to one or more static search result categories.

47. The computer-readable medium as recited in claim 46, further including instructions for performing the steps of presenting first search results corresponding to the one or more search result categories, and presenting second search results corresponding to the one or more static search result categories.

48. A computer-readable medium for presenting search results, the computer readable medium carrying one or more sequences of one or more instructions which, when processed by one or more processors, cause the one or more processors to perform the steps of:

receiving search results;

dynamically establishing one or more candidate search result categories based upon attributes of the search results;

presenting one or more candidate category identifiers corresponding to the one or more search result categories; and in response to a user selection of one or more of the one or more candidate category identifiers, establishing one or more final search result categories based upon both the one or more candidate search result categories and the user selection; and presenting one or more final category identifiers corresponding to the one or more final search result categories.

* * * * *